United States Patent Office 3,042,415
Patented July 3, 1962

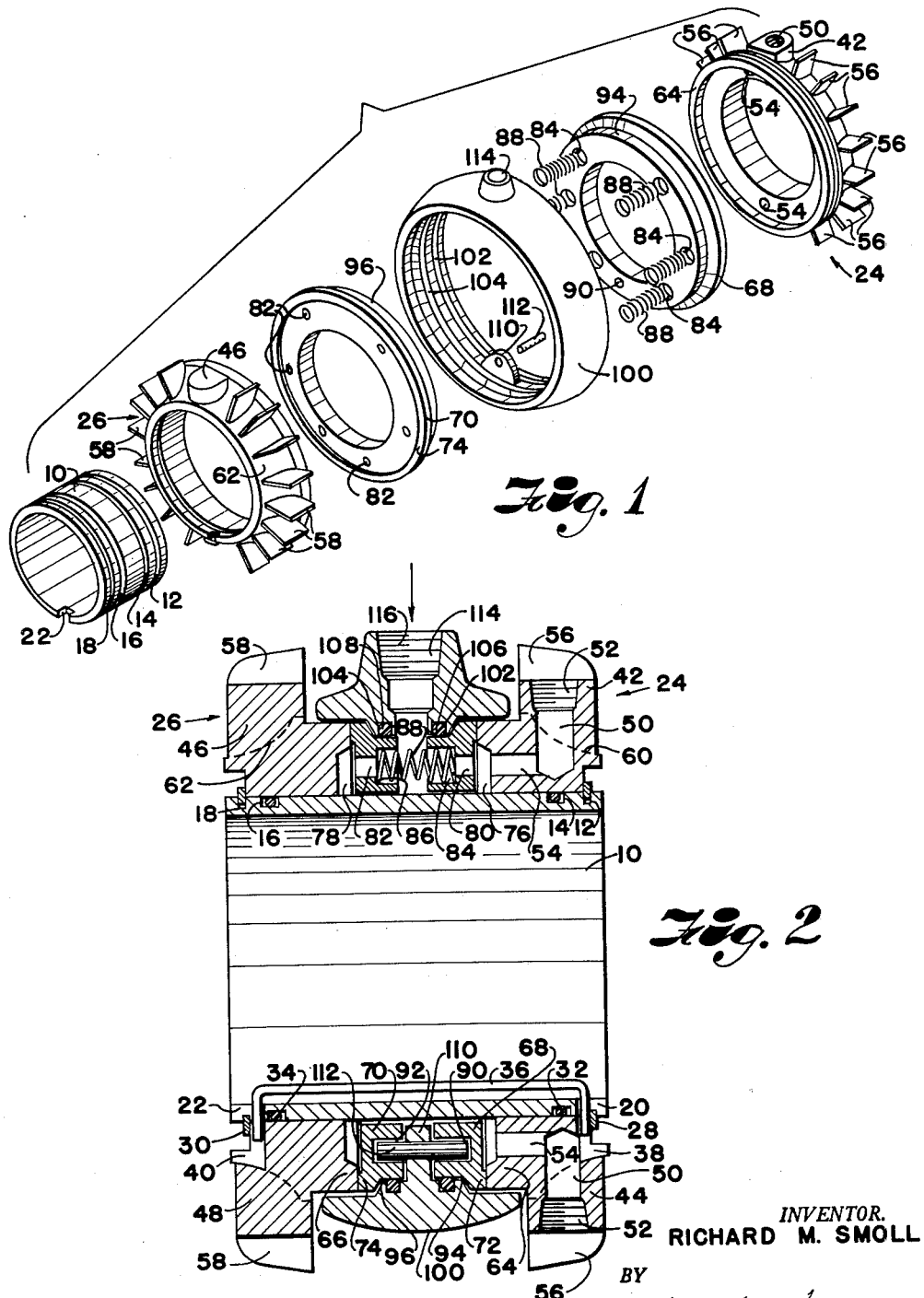

3,042,415
SHAFT ROTATING SEAL
Richard M. Smoll, Wichita, Kans., assignor to The Carlson Company, Inc., Wichita, Kans., a corporation of Kansas
Filed Dec. 5, 1960, Ser. No. 73,716
6 Claims. (Cl. 277—22)

This invention relates to sealing means. More specifically, the invention relates to sealing means particularly suitable for use with a rotating shaft. In another aspect, the invention relates to sealing means constructed so as to provide for heat dissipation. In another aspect, the invention relates to a balanced shaft rotating seal.

Various types of sealing means are known to the art. These include seals specifically adapted for rotating shafts and the like. The prior art devices fail to provide suitable heat radiating means, particularly where rotating shaft seals are concerned, and in many applications the presence of heat without dissipating same is undesirable. Furthermore, in many shaft rotating seal uses it is desirable that the seal means be balanced, and the prior art devices have failed to set forth suitable balanced shaft rotating seal construction.

In accordance with the present invention new sealing means are provided. More specifically, a new shaft rotating seal is provided which is preferably constructed to be balanced and preferably includes means for dissipating heat. Preferably, the invention includes sealing means in sealing and heat conducting relation with heat conducting means. In a preferred specific embodiment of the invention, the shaft rotating seal includes spaced end rings having sealing rings therebetween which are urged into engagement with the end rings. Preferably, a housing or the like is provided which includes means to receive an air inlet. Preferably, one of the end rings has an air outlet therein, and the entire sealing means is preferably constructed to provide a balanced unit. Heat radiating fin means are desirably included, such being preferably constructed on the end rings for best efficiency in dissipating heat, with the fin means in direct heat conductivity with the seal means.

Accordingly, it is an object of this invention to provide new seal means.

Another object of the invention is to provide a new shaft rotating seal.

A further object of the invention is to provide a balanced shaft rotating seal.

Another object of the invention is to provide a shaft rotating seal having means therewith to dissipate heat.

A still further object of the invention is to provide a new shaft rotating seal which is balanced and includes heat dissipation means.

Another object of the invention is to provide new shaft rotating seal means which are relatively easy to assemble and inexpensive to construct.

Various other objects, advantages and features of the invention will become apparent to those skilled in the art from the following description taken in connection with the accompanying drawings, in which:

FIG. 1 is an exploded view showing the various elements of a seal constructed in accordance with the invention.

FIG. 2 is an enlarged cross section view showing the seal of FIG. 1 assembled.

The following is a discussion and description of a preferred specific embodiment of the new shaft rotating seal of the invention, such being made with reference to the drawings where on the same reference numerals are used to indicate the same or similar parts and/or structure. It is to be understood that such discussion and description is not to unduly limit the scope of the invention.

Referring now to the drawings in detail, a generally cylindrical collar is shown at 10 which is preferably provided with two axially spaced grooves on the outside surface thereof at each end of the collar as shown at 12, 14, 16 and 18. Collar 10 also preferably has keyways 20 and 22 in the end portions thereof.

Two end rings, shown generally at 24 and 26, are preferably provided and are desirably positioned on the end portions of collar 10 in mirror image relation as shown in the drawings. Each of the end rings 24 and 26 are preferably made of a cast metal, however they can be made from other materials in any suitable manner. Each of the end rings 24 and 26 are positioned on the collar 10 in any suitable manner, such as by snap rings 28 and 30 being received by grooves 12 and 18 respectively. O-rings 32 and 34 can be located in grooves 14 and 16 of collar 10 respectively to seal end rings 24 and 26 with respect to collar 10. Also, key 36 can be provided and positioned in keyways 20 and 22 in collar 10 and keyways 38 and 40 in end rings 24 and 26, respectively, to secure collar 10 and the end rings together for rotation.

Preferably, each of the end rings 24 and 26 are provided with two diametrically opposed abutments, such being shown at 42 and 44 for end ring 24 and at 46 and 48 for end ring 26. At least one of the abutments, such as the abutment 42 on end ring 24, preferably has an aperture 50 radially formed therein opening to the interior of the ring. Aperture 50 is preferably threaded as shown at 52 to be connected to a conduit (not shown). An axially extending opening 54 communicates with aperture 50 as best seen in FIG. 2. Both of the abutments can be tapped as shown in the drawings, or one or more of the abutments of both end rings can be tapped.

End rings 24 and 26 are preferably provided with a plurality of fins 56 and 58, respectively. Preferably, each of the fins 56 and 58 are integrally formed with the end rings and located on the radially and axially outer surfaces thereof and extending therefrom. The axially outer portion of each of the end rings is preferably provided with a generally arcuate surface as shown at 60 and 62 on the rings 24 and 26 respectively from which the fins 56 and 58 extend. The fins 56 and 58 are preferably divided into two groups on each ring with the fins in each group being equally spaced between the abutments on the end rings. Eight fins are shown in each group in the shaft rotating seal shown in the drawings.

The inside of each of the end rings 24 and 26 preferably has a projecting portion as shown at 64 and 66, respectively, and the projecting portions are desirably provided with flat annular sealing surfaces. The opening 54 to end ring 24 in positioned radially within the projecting portion 64 thereon as illustrated in FIG. 2.

Two sealing rings 68 and 70, which are preferably made of a suitable anti-friction material such as carbon or the like, are received by collar 10 and positioned thereon in mirror image relation between the end rings 24 and 26. Each of the sealing rings 68 and 70 are preferably provided with a projecting portion having a flat annular sealing surface as shown at 72 and 74, respectively. The sealing surfaces on projecting portions 72 and 74 of sealing rings 68 and 70 are constructed on the outer sides thereof as shown to be in direct heat conducting contact and sealing relation with the sealing surfaces on the projecting portions 64 and 66 of end rings 24 and 26 respectively. The projecting sealing surfaces on the end rings and sealing rings form annular cavities or spaces as shown at 76 and 78 in FIG. 2.

Each of the sealing rings 68 and 70 desirably have at least one opening or hole 80 and 82 respectively therein, and preferably a plurality of such holes are provided, six being shown in the drawings. When a plurality of the holes 80 and 82 are provided, they are preferably circumferentially spaced as shown. Each of the holes 80 and 82 are preferably countersunk to form annular ledges 84 and 86 within each of the holes.

Suitable resilient means, such as the six helical springs shown at 88 are preferably provided and positioned between the sealing rings 68 and 70 to act in compression and urge the rings apart and to urge the sealing surfaces thereon into engagement with the sealing surfaces on the end rings. When the helical springs 88 are provided they can be received by the enlarged opening in the holes 80 and 82 to engage the ledges 84 and 86.

Each of the sealing rings 68 and 70 preferably has an opening therein as shown at 90 and 92, and the end rings are positioned so that the openings 90 and 92 are axially aligned. The radially outer surface of each of the sealing rings 68 and 70 are preferably provided with a portion of reduced diameter as shown at 94 and 96 respectively on the axially inner portions thereof.

A generally annular housing 100 is preferably provided which is positioned between and surrounds the sealing rings 68 and 70 with the radially inner surface of the housing being shaped to generally conform with the radially outer surface of the sealing rings. The radially inner surface of housing 100 is preferably provided with two spaced circumferential grooves 102 and 104 which receive O-rings 106 and 108 respectively. The O-rings 106 and 108 engage the radially outer surfaces of sealing rings 68 and 70 to seal the adjacent faces on the housing 100 and the sealing rings.

A relatively narrow and generally radially inwardly projecting flange 110 is preferably provided and is dimensioned so as to be positioned between the spaced sealing rings 68 and 70. Flange 110 is apertured as shown and receives a pin 112 which is also received by the openings 90 and 92 in sealing rings 68 and 70 respectively. This preferred construction connects the sealing rings 68 and 70 to housing 100, these three elements normally remaining stationary as the collar 10 and end rings 24 and 26 rotate.

A radially extending and generally axially centrally located aperture 114 is provided in housing 100 and is preferably threaded as shown at 116 to be secured to a conduit (not shown) leading to a stationary source of fluid under pressure. Aperture 114 is in fluid communication with the space between the sealing rings 68 and 70 as best shown in FIG. 2.

In use, the shaft rotating seal is assembled as shown in FIG. 2 and same is positioned on a rotatable shaft in any suitable means, such as by the use of the key member 36 being received by a suitable slot or groove in the shaft (not shown). In some instances, the end rings, sealing rings and housing can be positioned on the shaft itself and collar 10 can be dispensed with. A conduit from a fluid source is connected to aperture 114 and a conduit to a rotatable member is connected to one or more of the apertures 50 in end rings 24. The conduit from aperture 50 can be connected to any suitable member, such as to clutches or brakes of the type requiring a fluid under pressure for operation, such being shown in my Patent No. 2,941,642 entitled Clutch or Brake. As the shaft is rotated, collar 10 and end rings 24 and 26 will turn therewith and the housing 100 and sealing rings 68 and 70 will remain stationary. The sealing surfaces on the end rings and sealing rings will be firmly engaged by virtue of the helical springs 88 or other resilient means, thereby preventing loss of fluid between the sealing and end rings. The O-rings 32 and 34 will prevent the leakage of fluid between the end rings and the collar, and the O-rings 106 and 108 will prevent the leakage of fluid between housing 100 and the sealing rings 68 and 70. Thus, a fluid from a stationary source can be supplied to opening 114 and such will be sealed in the spaces or cavities between the sealing rings, and between the sealing rings and the end rings. The fluid thus supplied to the shaft rotating seal can pass freely through the holes 80 to be received by the opening 54 and aperture 50 in the end ring 24 to be supplied to a conduit connected thereto.

The preferred shaft rotating seal described is constructed so that the air under pressure supplied to inlet 114 will be evenly distributed about the sealing members. This is an important feature since the contacting surfaces on the end rings 24 and 26 and on the sealing rings 68 and 70 will be maintained in proper sealing relation and the seal will be balanced. The air in cavities 76 and 78 will in effect oppose the air pressure acting against the inner surfaces of the sealing member and prevent the sealing surfaces from being urged together too tightly, while at the same time the sealing surfaces will not be urged apart to such an extent as to permit fluid to pass between the sliding seal.

As will be seen from the foregoing description, the sealing rings 68 and 70 are in heat conducting engagement with the end rings 24 and 26 by virtue of the projecting sealing portions on the respective members. Thus, any heat present in the seal will be transferred through these engaging surfaces to the end rings. Any heat at the end rings will be readily dissipated to the atmosphere by virtue of the provision of the fins 56 and 58. This dissipation of the heat will be facilitated by the construction of the shaft rotating seal described since the radiating fins are provided on the member which rotate and are therefore cooled more readily by the rotating movement.

While the invention has been described in connection with a preferred specific embodiment thereof, it will be understood that this description is intended to illustrate and not to limit the scope of the invention, which is defined by the claims.

I claim:

1. A balanced shaft rotating seal comprising, in combination, a generally cylindrical collar, each end portion of said collar having two axially spaced grooves on the outside surface thereof constructed to receive a snap ring and an O-ring, said collar having a keyway in each end portion thereof, and two O-rings, said O-rings being positioned in the inner ones of said grooves in said collar, two cast end rings, each of said end rings having two diametrically opposed abutments on the radially outer surface thereof, one of said abutments on one of said end rings having an aperture therein opening to the interior of said ring, said aperture being threaded to be attached to a rotating air outlet conduit, each of said end rings having two groups of eight radially extending heat conducting fins on the radially and axially outer surfaces thereof, said fins in each of said groups of fins on each of said rings being integral with said end rings and equally spaced between said abutments, the inside surface of each of said rings having a flat centrally located annular sealing surface on a projecting portion of said rings, said inside surface of said one of said sealing rings having an axially extending opening therein communicating with said aperture in said abutment, said opening in said inside surface of said one of said sealing rings being positioned radially within said sealing surface thereon, said rings being positioned in mirror image relation on opposite end portions of said collar for rotation therewith with the radially inner surfaces thereof in sealing engagement with said O-rings, two snap rings, said snap rings being received by the outer ones of said grooves in said collar to position said end rings on said collar, two carbon sealing rings slidably received by said collar and positioned in mirror image relation between said end rings, each of said sealing rings having a projecting portion having a flat annular sealing surface on the outer side thereof in direct heat conducting contact and sealing relation with said sealing surfaces of said end rings, said end rings and said sealing rings defining with said collar generally annular cavities, each of said sealing rings having six circumferentially spaced holes therethrough in fluid communication with said cavities, each of said holes being countersunk at the axially inner side of each of said sealing rings to form an annular ledge, six helical springs, said holes in said sealing rings being axially aligned with said springs being received in facing holes of both of said sealing rings with the ends of said springs engaging said ledges, said springs being in compression to urge said sealing rings apart and to urge said sealing surfaces thereon into sealing engagement with said sealing surfaces on said end rings, each of said sealing rings having an opening therein facing inwardly, said openings in said sealing rings being axially aligned, the axially inner portion of the radially outer surface of each of said sealing rings being reduced in diameter, a generally annular housing surrounding said sealing rings, the radially inner surface of said housing being shaped to conform to the radially outer surface of said sealing rings, said radially inner surface of said housing having two spaced circumferential grooves formed therein, and two additional O-rings, said last-named O-rings being received by said grooves in said radially inner surface of said housing to engage the radially outer surface of said sealing rings in sealing and binding engagement, a relatively narrow radially inwardly projecting flange on said radially inner surface of said housing, said flange having a hole therethrough and said hole being aligned with said openings in said sealing rings, a pin received by said openings in said sealing rings and passing through said hole in said flange, a radially extending and axially centrally located aperture in said housing, said aperture in said housing being threaded to receive a stationary air inlet, said aperture being in fluid communication with a generally annular space between said sealing rings, said device being constructed and adapted so that said collar can be mounted on a rotatable shaft with a key in said shaft and said keyway in said collar to lock same together and with said aperture in said housing connected to a stationary air inlet and said aperture in said one of said end rings connected to a rotatable air outlet, said apertures in said housing and said one of said end rings being in fluid communication through said space between said sealing rings, said apertures in said sealing rings, one of the annular cavities defined by said sealing rings and said end rings and said opening in said one of said end rings so that a fluid under pressure from a stationary source can be continuously supplied to the rotatable air outlet in said one of said end rings.

2. A balanced shaft rotating seal comprising, in combination, a cylindrical collar, each end portion of said collar having grooves thereon constructed to receive a snap ring and an O-ring, and two O-rings, said O-rings being positioned in the inner ones of said grooves in said collar, two end rings, each of said end rings having two diametrically opposed abutments on the outer surface thereof, at least one of said abutments on one of said end rings having an aperture therein opening to the interior of said ring, each of said end rings having two groups of radially extending heat conducting fins on the outer surfaces thereof, said fins being integrally formed with said end rings and equally spaced between said abutments, the inside surface of each of said end rings having an annular sealing surface on a projecting portion of said rings, an opening on the inside surface of said one of said end rings within said sealing surface thereon communicating with said aperture, said end rings being mounted in mirror image relation on opposite end portions of said collar for rotation therewith with the radially inner surfaces thereof in sealing engagement with said O-rings, snap rings received by the outer ones of said grooves in said collar to position said end rings thereon, two carbon sealing rings slidably received by said collar and positioned in mirror image relation between said end rings, each of said sealing rings having a projecting portion having a sealing surface in direct heat conducting contact and sealing relation with said sealing surfaces of said end rings, each of said sealing rings having a plurality of spaced holes therethrough, each of said holes being countersunk to form annular ledges in facing relation, spring means received by said holes and engaging said ledges therein to bias said sealing rings apart and into sealing relation with said end rings, a generally annular housing surrounding said sealing rings in mating relation therewith, spaced circumferential grooves formed on the radially inner surface of said housing, said last-named grooves receiving O-rings to sealingly engage said housing and said sealing rings, means with said sealing rings and said housing to lock same together, a radially extending aperture in said housing communicating with the space between said sealing rings, said device being constructed and adapted so that said collar can be mounted on a rotatable shaft with said aperture in said housing connectable to a stationary air inlet and said aperture in said one of said end rings connectable to a rotatable air outlet with said apertures being in fluid communication through said space between said sealing rings and said openings in said sealing rings so that a fluid under pressure from a stationary source can be supplied to the rotatable air outlet in said one of said end rings.

3. A balanced shaft rotating seal comprising, in combination, two end rings, one of said end rings having a radially extending aperture therein opening to the interior of said rings, said one of said end rings having an axially extending opening therein communicating with said aperture, each of said end rings having a plurality of integral heat conducting fins on the outer surfaces thereof, the inside surface of each of said rings having a flat centrally located annular sealing surface on a projecting portion of said rings, two sealing rings positioned in mirror image relation between said end rings, each of said sealing rings having a projecting portion having a flat annular sealing surface in direct heat conducting contact and sealing relation with said sealing surfaces of said end rings, each of said sealing rings having a plurality of circumferentially spaced holes therethrough, each of said holes being countersunk to form facing annular ledges, and a plurality of springs engaging said ledges to urge said sealing rings apart and into engagement with said end rings, a housing surrounding said sealing rings, means connecting said housing and said sealing rings together, a radially extending aperture through said housing, said aperture constructed to receive a stationary air inlet and positioned to be in fluid communication with a space between said sealing rings, said device being constructed and adapted so that said housing can be connected to a stationary air inlet and said aperture in said one of said end rings connected to a rotatable fluid outlet so that a fluid under pressure can be continuously supplied to the rotatable air outlet.

4. A shaft rotating seal comprising, in combination, two end rings, each of said end rings having a plurality of circumferentially spaced heat conducting fins, an opening through one of said end rings defining a fluid conduit, two sealing rings positioned between said end rings, said sealing rings and said end rings having projecting portions with flat sealing surfaces in direct heat conducting contact and sealing relation with each other, each of said sealing rings having at least one opening therethrough, resilient means engaging said sealing rings to urge same into sealing contact with said end rings, a housing surrounding said sealing rings, said housing having an aperture therethrough, said device being constructed and adapted so that fluid from a stationary source can be supplied to said aperture in said housing and through said seal to said opening in said one of said end rings.

5. Shaft rotating seal means comprising, in combination, two ring members positioned in spaced relation, said ring members having the outer surface thereof in fluid communication with the atmosphere, having a relatively large surface and shaped to rapidly dissipate heat therefrom, two sealing members positioned between said end ring members and in direct heat conducting and fluid sealing contact therewith, said sealing members and said end ring members having sealing surfaces in sliding engagement, means engaging said sealing members and holding said sealing surfaces into engagement, a housing stationarily mounted relative to said sealing members, said housing, said sealing members, and at least one of said end ring members having openings therethrough defining a fluid passageway open at all times so that a fluid can be passed through said housing, said sealing rings and said one of said end ring members.

6. Seal means comprising, in combination, a housing, sealing means stationarily mounted relative to said housing, heat radiating means having a surface in heat conducting and fluid sealing engagement with said sealing means and slideably moveable relative to said sealing means, the outer surface of said radiating means being in direct contact with the atmosphere having a relatively large surface and shaped to rapidly dissipate heat to the atmosphere, said housing, said sealing means and said radiating means having openings therethrough in fluid communication with each other and defining a fluid passageway open at all times so that a fluid can be transmitted therethrough.

References Cited in the file of this patent
UNITED STATES PATENTS

| | | |
|---|---|---|
| 2,628,852 | Voytech | Feb. 17, 1953 |
| 2,723,868 | Hartranft | Nov. 15, 1955 |